United States Patent [19]

Daniel

[11] 4,232,289
[45] Nov. 4, 1980

[54] AUTOMOTIVE KEYLESS SECURITY SYSTEM

[76] Inventor: Don H. Daniel, 5114 Huisache, Bellaire, Tex. 77401

[21] Appl. No.: 954,234

[22] Filed: Oct. 24, 1978

[51] Int. Cl.³ .................................................. B60R 25/04
[52] U.S. Cl. ........................................ 340/64; 340/53; 340/543; 340/576; 180/272
[58] Field of Search ............... 340/52 R, 52 F, 53, 340/63, 64, 543, 576; 180/272

[56] References Cited

U.S. PATENT DOCUMENTS 3,611,287  10/1971  Hoff .................................... 340/63

*Primary Examiner*—Alvin H. Waring

[57] ABSTRACT

An automotive security, convenience and fuel saving system which utilizes a pushbutton combination panel in lieu of conventional keys to control all access to ignition and engine compartment, prevent burglary of mounted components, save fuel, and screen physically and mentally disabled drivers. Basic to the system are pulse gates, pulse triggered locking and unlocking means for hood-ignition-start, burglar alarm pulses to the horn, improved fuel economy pulses to the air conditioner, and pulses to screen physically or mentally disabled drivers. The invention further consolidates and improves the efficiencies of each of these functions and is a new application for and an extended use of electric permutation locks referenced and as modified.

10 Claims, 3 Drawing Figures

AUTOMOTIVE KEYLESS SECURITY SYSTEM

SUMMARY

In this automotive invention, a remote error sensing pushbutton combination panel provides both simultaneous and keyless access to both the ignition and engine compartment. The merging of these two entities causes both to become highly, if not completely, invulnerable to common and ordinary drive away theft. There are no keys, buzzers or mechanical locks required by any authorized driver for ignition, burglar alarm, hood lock or starter. Windows can be safely left open.

Pulse outputs available in the unlocking and alerting circuits are further utilized to pulse the air conditioner clutch on-off at a desired rate to obtain a reduced and controlled duty cycle with resultant increased economy and comfort. Tamper switches and sensors are used to trigger a highly efficient and effective burglar alarm. Pulse circuits also provide a time gate that can be utilized to screen physically or mentally disabled or drunk drivers through driver restriction. Thus the invention achieves more convenience, more security, more comfort, better fuel economy, better hardware economies and greater public safety than has heretofore been achieved.

Further objects of the invention will best be understood and appreciated from the following description of a preferred embodiment thereof, selected for purposes of illustration and shown in the accompanying drawing, in which;

FIG. 3 illustrates a sectional view of the plunger receptacle locking mechanism.

| REFERENCES CITED | | |
|---|---|---|
| 3,631,444 | 12/1971 | Daniel |
| 3,441,808 | 4/1969 | Crane |
| 2,843,843 | 7/1958 | Davis |
| 2,855,588 | 10/1958 | Allen |
| 3,024,452 | 3/1962 | Leonard |
| 3,411,152 | 11/1968 | Jackson |

OPERATION

Plunger and Ignition Unlock

Figure 1:
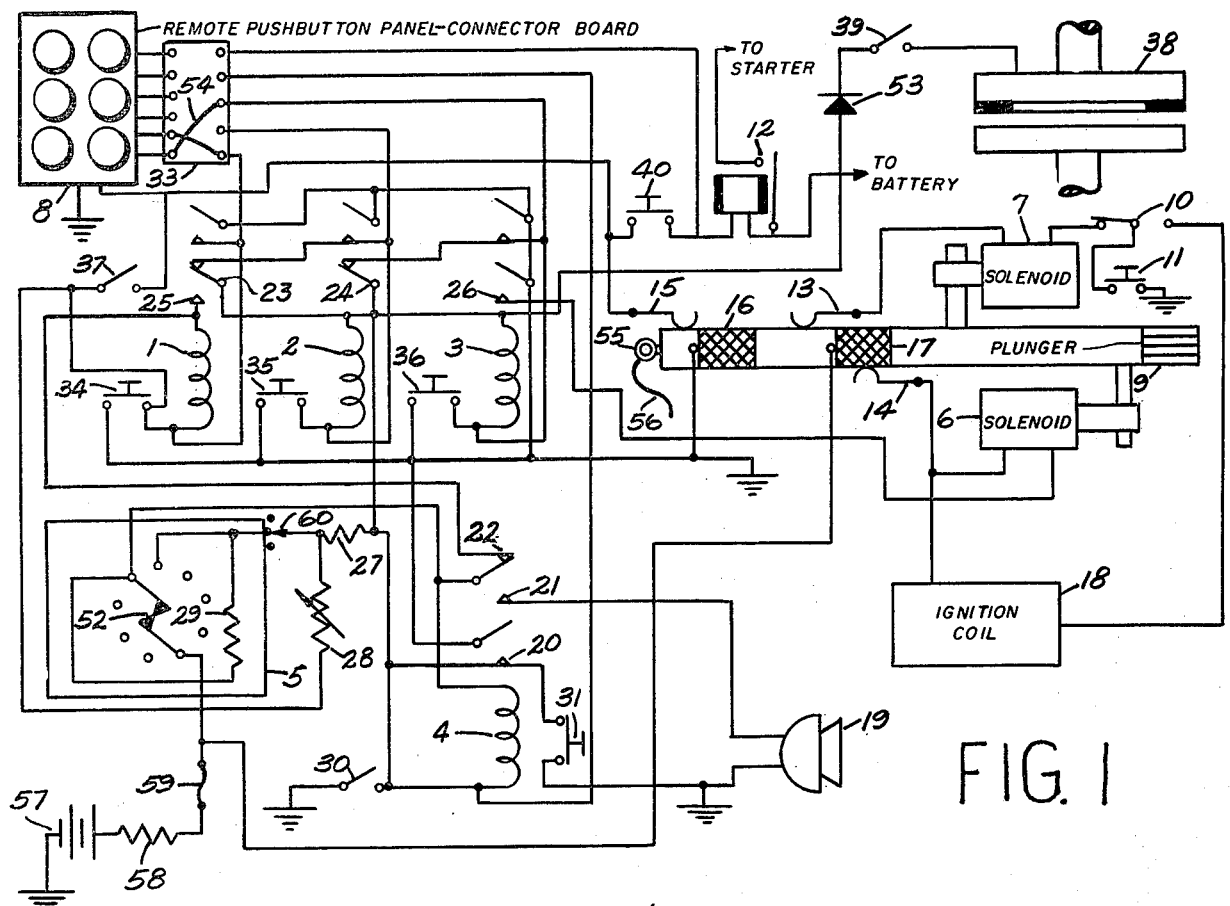
FIG. 1 is a schematic representation of all electromechanical aspects of a complete system as it relates to a gasoline engine.
Figure 2:
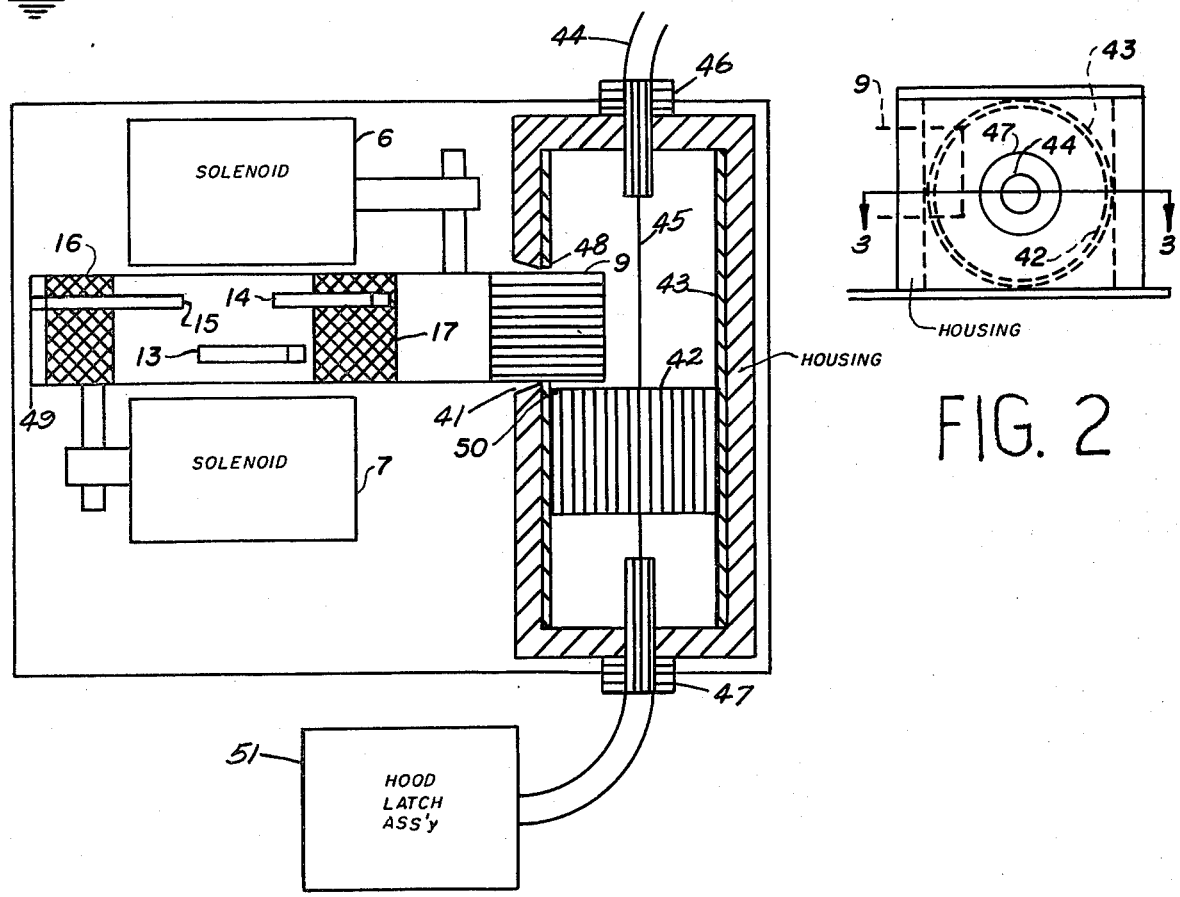
FIG. 2 illustrates an end view of the plunger receptacle locking mechanism.

Referring now to FIG. 1, to operate unlock solenoid 6 and move plunger 9 to unlock position, relays 1, 2, and 3 must be actuated in sequence by outside momentarily lighted panel 8. The actuation of final relay 3 causes an arbitrary ground pulse to be applied through contact 26 to the negative terminal of unlock solenoid 6. This ground pulse will actuate unlock solenoid 6 and plunger 9 if there is a conditional positive voltage at the positive terminal of unlock solenoid 6, the condition being that plunger 9 operated contact 17 is feeding solenoid 6 positive terminal through conditional contact 14. Unlock solenoid 6 will automatically deactivate when contact 14 is switched off as plunger 9 moves to unlock position. As unlock solenoid 6 becomes actuated, plunger 9 moves to unlock position, unlocking the hood and turning ignition assembly 18 on by closing contact 14. Starter relay 12 can then be actuated by outside switch 40, which is enabled by plunger 9 being in unlock position and plunger actuated switch 16 being closed.

Plunger and Ignition Lock (Engine Stop)

Referring again to FIG. 1, to operate lock solenoid 7, an arbitrary ground pulse is fed through switch 10 to the lock solenoid 7 by outside pushbutton switch 11. This ground pulse will actuate lock solenoid 7 and plunger 9 if there is a conditional voltage at the positive terminal of lock solenoid 7, the condition being that plunger 9 is in the unlocked position and that plunger 9 operated switch contact 17 is feeding lock solenoid 7 positive terminal through conditional contact 13. Lock solenoid 7 will deactivate automatically when contact 13 is switched off as plunger 9 moves to lock position. Ignition will also be turned off at contact 13.

Remote Hood Release Cable Enable-Disable

Referring now to FIG. 3, as lock solenoid 7 is actuated, plunger 9 enters aperture 41 of travel rod 42 housing 43 and blocks the unlock travel path of travel rod 42 which moves with the movable core of hood release cable 44. The outer covering of the hood release cable 44 is secured at end anchor points 46 and 47. Plunger 9, mounted at right angles to the movement of travel rod 42, acts as a lever with fulcrum at point 48. Leverage force exerted at point 49 is small in comparison to the counter force exerted at point 50.

In plunger 9 unlock position, plunger 9 is retracted from the travel path of travel rod 42, allowing travel rod 42 to move in response to an operator pulling force exerted on the handle of the remote hood latch cable 44. As operator pulling force is released, travel rod 42 is pulled by spring tension of the hood latch assembly 51 to its normal position, in which position the hood latch assembly 51 is locked and travel rod 42 can be blocked by plunger 9.

Pulse Outputs

An arbitrary positive voltage has its source at battery 57 through dropping resistor 58, fuse 59 and one or more thermal relays 5, each thermal relay 5 connected in series. The active thermally opening relay 5 in such a series is selected by switch 60 which connects a feedback voltage from either relay 1 or relay 4 to the heater 29 of the selected thermal relay 5. The heater 29 of the selected thermal relay 5 heats contacts 52 and eventually causes their opening.

Voltage pulse outputs vary in width and are utilized in various ways. Each output is either a voltage pulse or a ground pulse having its beginning or end, or both, controlled by relays 1 and 4 and the feedback that these relays supply to heater 29 of the switch 60 selected thermal relay 5. Additional width control is provided by variable resistor 28.

When relay 1 becomes actuated by outside pushbutton 34, a voltage pulse begins on arm 23. This voltage is then passed to the armatures of relays 2 and 3 and then to outside switch 39. Finally, at the end of the unlock combination sequence, i.e. when relay 3 is actuated, a ground pulse is started at contact 26. This ground pulse is used to actuate unlock solenoid 6 if unlock solenoid 6 is in locked position. The ground pulse at contact 26 is terminated when contacts 52 open as a result of ground voltage being applied to heater 29 through variable resistor 28.

When relay 1 is actuated by outside continuous and conditional switch 37, the condition being that plunger 9 is in unlock position and plunger 9 actuated switch 16 is closed, a voltage pulse train occurs on arm 23 until conditional switch 37 is opened or plunger 9 ismoved to lock position and plunger actuated switch 16 is opened. This pulse train is utilized by the air conditioner compressor clutch 38 as an automatic means of controlling the duty cycle of the compressor.

Alarm Actuation

Alarm actuation occurs if an unlocking pushbutton 34, 35, or 36 ispressed out of sequence, or if a tamper puhsbutton 31 is pressed, or if a burglar alarm sensor switch 30 is tripped anywhere in the automobile. Pushbutton sequence errors are detected when ground voltage appears on arms 23 or 24. Any one of these three conditions causes alarm relay 4 to be actuated. The actuation of relay 4 resets relays 1-3 by opening contacts 22. Actuation of relay 4 also causes a positive voltage to be applied to the horn 19 through contacts 21. Actuation of relay 4 also causes a ground voltage to be applied, through blocking resistor 27, to the heater 29 of thermal relay 5. The ground voltage to heater 29 of thermal relay 5 causes contacts 52 to eventually open the voltage supply to relay 4 and thus deactivate relay 4 and horn 13. If the sensing source switch is still switched, the same cycle will repeat continuously, as required.

Duty Cycle Reduction Pulses to Air Conditioner

When relay 1 becomes actuated by continuous and conditional switch 37, the condition being that plunger 9 is in unlock position and plunger 9 actuated switch 16 is therefore closed, a continuous pulse train is fed to the air conditioner clutch 38 through arm 23 and isolating diode 53. This pulse train causes the air conditioner clutch 38 to engage and disengage at the pulse rate, which is made adjustable by variable resistor 28 and switch 60 selected thermal relay 5, as described under Pulse Outputs. Thus the duty cycle of the air conditioner is reduced, as desired, from the full one hundred percent. The reduced duty cycle results in better fuel economy, cooler engine, better driving comfort, better cooling control, and less wear on the manual air conditioner switches. The air conditioner blower can also then be turned to medium or high and the vents directed for even more efficiency and without discomfort to any occupant. Air conditioner winter operating requirements are automatically satisfied by regular single pulse actuation of clutch 38, as provided through switch 39.

Disabled or Drunk Driver Inhibitor

Drivers who have certain mental or physical defects or problems that make their driving hazardous may have restrictions placed upon them. The invention offers a means of implementing such restriction.

As relay 1 becomes actuated by outside pushbutton combination switch 34, if hood and ignition 18 unlock is to be achieved, the remainder of the combination must be pressed before relay 1 becomes automatically deactivated by the opening of thermal relay 5, as explained under Pulse Outputs. The time limit is set by variable resistor 28 and the operating characteristics of thermal relay 5. This time limit, together with the number of step relays in the combination can be set to screen for any degree of physical or mental disability or intoxication.

Changing of Combination Sequence

Unlock depends on successively actuating, by outside switch panel 8, relays 1-3, which is accomplished by successively grounding, within one positive voltage pulse at arm 23 of relay 1, terminals recognizable as 1-3 on connector board 33 which is located under the hood. Also identifiable at the connector board 33 are the outputs of the outside pushbutton switch panel 8, by which the relay terminals 1-3 are grounded. Jumper wires 54 are used to connect the first step pushbutton to relay terminal 1, the second step pushbutton to relay terminal 2 and the third step pushbutton to relay terminal 3. The pushbutton selected to actuate the engine starter relay 12 is connected to starter relay terminal 5. Any selected tamper pushbuttons 31 and all burglar alarm sensors 30 are connected to the alarm relay 4 terminal 4.

Thus, with simple instructions posted under the hood, the owner can quickly and easily change combinations as often as desired. Since combinations can be changed in fifteen seconds or less, combinations can be given to parking attendants, mechanics or anyone else more safely than with conventional keys.

The outside pushbutton control panel 8, and indeed all other control pushbuttons of all automotive functions, are made far less vulnerable to unauthorized use by grouping and intermingling pushbuttons of like functions with pushbuttons of unlike function so that all grouped pushbuttons are indistinguishable both in appearance and location. Such grouping makes the unlock combination more difficult and also precludes the use of any pushbutton without running the high risk of triggering an alarm. Thus by association all pushbuttons are made safe from unauthorized use.

Auxiliary Access To Locking Mechanism

A secret auxiliary access means is provided by hidden or special access to a cable, whereby a longitudinal pulling force can be manually exerted on plunger eyelet 55, thereby unlocking plunger 9. A short length of flexible cord 56 is used to allow freedom of movement of plunger 9. The hidden access to this auxiliary means is located anywhere in the automobile and is made, by the owner, as inaccessible as desired.

Special Authorized Use

Switch 10, located under the hood, provides a means to disable plunger 9 lock solenoid 7, thereby leaving the ignition assembly 18 on and the hood unlocked. In this condition the ground voltage normally fed to the lock solenoid 7 to kill the engine, lock the ignition and lock the hood is diverted by switch 10 to the ignition system 18 to kill only the spark and leaving the hood and ignition unlocked and on. This switch is provided for conditions of special authorized use.

I claim:

1. In an electric permutation lock and alerting system having, in cascade, a plurality of combination selecting stages operable by remote switch means, actuation of first said stage being dependent on actuation of said remote switch means, actuation of each successive said stage being dependent on successive actuation of said remote switch means plus actuation of each prior said stage, actuation of final said stage causing an unlock voltage to operate a plunger means, having lock and unlock means to move said plunger means in opposite directions, wherein the improvement comprises an automotive application whereby said plunger means, in locked position, blocks the unlock travel path and movement, in the unlock direction, of a remote hood latch cable, and wherein said blockage of said movement in unlock direction prevents access to the engine compartment.

2. The automotive electric permutation lock and alerting system of claim 1, wherein the invention comprises switch means actuated by said plunger means, by which an ignition system is enabled when said plunger means is in unlock position and by which said ignition system is disabled when said plunger means is in lock position, and whereas said plunger means and said switch means are physically accessible only through said engine compartment.

3. The automotive electric permutation lock and alerting system of claim 1, wherein the invention comprises the further utilization of said combination selecting stages, wherein the output of a selected said stage is a voltage pulse, actuation of said selected stage beginning said pulse, actuated said selected stage supplying feedback to a self restoring circuit breaker, said feedback resulting in the temporary opening of said circuit breaker, said opening causing said circuit breaker to interrupt source voltage of said combination selecting stages, said interruption terminating each said pulse, said pulse acting as a time gate requiring, for unlock, the remaining said combination selecting stages to be actuated within the duration of one said pulse, and whereby said time gate is used to screen physically or mentally disabled or unauthorized drivers from operating the automobile.

4. The automotive electric permutation lock and alerting system of claim 1, wherein the improvement comprises the new and extended use of the conventional automotive starter relay, actuation of said starter relay by said remote switch means, actuation of said starter relay being also dependent on said plunger means being in unlock position, and whereas said plunger means in lock position requires, for engine start, the successive actuation of each said combination selecting stage, followed then by actuation of said starter relay by said remote switch means, whereby actuation of said starter relay is the final step in a successive series of remote controlled steps required to start the engine.

5. In an automotive electric permutation lock and alerting system having, in cascade, a plurality of combination selecting stages operable by remote switch means, actuation of first said stage being dependent on actuation of said remote switch means, actuation of each successive stage being dependent on successive actuation of said remote switch means plus actuation of each prior said stage, actuation of final said stage causing an unlock voltage to operate an ignition unlock means, wherein output of a selected said stage is a voltage pulse, actuation of said selected stage beginning said pulse, actuated said selected stage supplying feedback to a self restoring circuit breaker, said feedback resulting in the temporary opening of said circuit breaker, said opening causing said circuit breaker to interrupt source voltage of said combination selecting stages, said interruption terminating said pulse, wherein the invention comprises that said remote switch means include a continuous switch means whereby said pulse is repeated in a cyclic fashion to form a voltage pulse train, said voltage pulse train used to actuate and deactuate, at the duty cycle of said voltage pulse train, the duty cycle of an automotive air conditioner compressor, whereby the output of said compressor is controlled by said voltage pulse train.

6. The automotive electric permutation lock and alerting system of claim 3, wherein the improvement comprises that any attempted actuation, by said remote switch means, of said combination selecting stages, by other than said successive actuation during one said voltage pulse, causes a trigger voltage and resulting holding voltage to be applied to an alarm switch means, by which said alarm switch means remains actuated, said combination selecting stages are reset, and an alarm voltage pulse actuates an alarm means, width of said alarm voltage pulse being determined by the amount of voltage feedback from said alarm switch means to a self restoring circuit breaker, said circuit breaker supplying source voltage to said alarm switch means, said voltage feedback resulting in the temporary opening of said circuit breaker, said opening causing interruption of said source voltage, said interruption resetting said alarm switch means to its normal state.

7. The automotive electric permutation lock and alerting system of claim 1, wherein the improvement comprises the physical grouping and intermingling of said remote switch means of like functions with remote other switch means of unlike functions, whereby said grouping and said intermingling causes said remote switch means of said like functions to be indistinguishable in appearance and location from said remote other switch means of unlike functions, and whereby said indistinguishable appearance and said indistinguishable location makes each said remote switch means of said like functions and each said remote other switch means of said unlike functions less vulnerable to unauthorized use, and whereas any said unauthorized use is susceptable to alarm actuation.

8. The automotive electric permutation lock and alerting system of claim 1, wherein the improvement comprises that connecting means between the outputs of said remote switch means and the inputs to said combination selecting stages have common interconnector means, whereby said successive actuation sequence inputs and said outputs of said remote switch means can be readily identified, and whereby said inputs and said outputs can be cross connected, and whereas said interconnector means is located under the hood.

9. The automotive electric permutation lock and alerting system of claim 1, wherein the improvement comprises the new and extended use of the conventional remote hood release cable train as the locking medium by which the automobile hood is locked and unlocked by said plunger means.

10. The automotive electric permutation lock and alerting system of claim 1, wherein the improvement comprises the further utilization of said voltage pulse, whereby said voltage pulse is used to pulse the clutch of an air conditioner compressor, whereby the frequency and duration of said voltage pulse, as said voltage pulse is used to operate said plunger means, is sufficient to automatically satisfy the winter off season operating requirements of said air conditioner compressor, and whereas said requirement is met effectively, automatically and without driver attention.

* * * * *